US 6,561,245 B1

(12) United States Patent
Close et al.

(10) Patent No.: US 6,561,245 B1
(45) Date of Patent: May 13, 2003

(54) THREAD REINFORCEMENT MEANS FOR EXTENDED MOBILITY TIRE

(75) Inventors: Roland Close, Burg-Reuland (BE); Agnes Nathalie Iwana Verbeke-Ensch, Arlon (BE); Gia Van Nguyen, Rossignol (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/719,475

(22) PCT Filed: Jul. 10, 1998

(86) PCT No.: PCT/US98/14452

§ 371 (c)(1),
(2), (4) Date: Dec. 11, 2000

(87) PCT Pub. No.: WO00/02740

PCT Pub. Date: Jan. 20, 2000

(51) Int. Cl.⁷ .............................. B60C 17/00; B60C 9/18
(52) U.S. Cl. .................. 152/517; 152/526; 152/534; 152/535; 152/536
(58) Field of Search .................................. 152/517, 526, 152/534, 535, 536, 548, 557, 550

(56) References Cited

U.S. PATENT DOCUMENTS

| | | | |
|---|---|---|---|
| 3,656,533 A | * | 4/1972 | Barassi et al. ............... 152/527 |
| 4,111,249 A | | 9/1978 | Markow |
| 4,203,481 A | * | 5/1980 | Ranik, Jr. .................... 152/375 |
| 5,368,082 A | | 11/1994 | Oare et al. |

FOREIGN PATENT DOCUMENTS

| | | | |
|---|---|---|---|
| DE | 28 14 937 | | 10/1978 |
| EP | 0605177 | | 7/1994 |
| EP | 0778164 | | 6/1997 |
| FR | 2287350 | | 5/1976 |
| FR | 2425334 | | 12/1979 |
| FR | 2460218 | | 1/1981 |
| GB | 1429876 | * | 3/1976 |
| JP | 03189209 | * | 8/1991 |
| JP | 05131810 | * | 5/1993 |
| JP | 06171308 | * | 6/1994 |
| WO | WO98/54014 | | 12/1998 |

* cited by examiner

*Primary Examiner*—Michael W. Ball
*Assistant Examiner*—Justin Fischer
(74) *Attorney, Agent, or Firm*—Howard M. Cohn (57) ABSTRACT

A pneumatic radial ply tire (50) having a tread (52), a carcass (60) with two sidewalls (77, 78), two or more radial plies (70, 72), two annular beads (36a′, 36b′), a belt structure (56) located radially between the tread and the radial ply structure (58), one or more circumferentially deployed high-modulus incompressible belt reinforcements (66) and/or two or more circumferentially deployed high-modulus tensile-stress-bearing fabric reinforcements (59). Belt reinforcement(s) (66) and/or fabric reinforcement(s) (59) work to increase the lateral and circumferential rigidity of the tread (52) and underlying structures of the carcass (60). The lateral and circumferential stiffening of the tread (52) enhances high-speed runflat handling and contributes to improved runflat operational life.

6 Claims, 6 Drawing Sheets

THREAD REINFORCEMENT MEANS FOR EXTENDED MOBILITY TIRE

TECHNICAL FIELD

The present invention relates to a pneumatic, radial ply, runflat tire whose runflat handling is improved by providing a structural means for stiffening the tread and its underlying support structure. More specifically, the invention relates to a runflat tire having increased rigidity laterally across the tread to resist-upward buckling of the center part of the tread and its underlying structure during high-speed runflat operation, whereby the tread's ground contact, lateral grip and runflat operational life is enhanced.

BACKGROUND OF THE INVENTION

Various methods have been devised for enabling the safe continued operation of unpressurized or underpressurized vehicle tires with the intent of minimizing further damage to the uninflated tire and without simultaneously compromising vehicle handling over a distance from the place where the tire has lost its pressure to a place desired by the driver, such as a service station, where the tire can be changed. Loss of tire pressure can result from a variety of causes, including puncture by a foreign object such as a nail or other sharp object piercing the pneumatic tire installed on a vehicle.

Pneumatic tires designed for sustained operation under conditions of unpressurization or underpressurization are also called runflat tires, as they are capable of being driven in the uninflated or "flat" condition. The conventional pneumatic tire, when operated without inflation, collapses upon itself, its sidewalls buckling outward in the region where the tread contacts the ground, when supporting a vehicle load. In general, the term "runflat" means that the tire structure alone has sufficient rigidity and strength to support the vehicle load when the tire is operated in the uninflated condition. The sidewalls and internal surfaces of the tire do not collapse or buckle onto themselves, and the tire does not otherwise contain or use other supporting structures or devices to prevent the tire from collapsing.

An early example of a runflat tire design is described in U.S. Pat. No. 4,111,249, entitled the "Banded Tire," in which a hoop or annular band approximately as wide as the tread is circumferentially deployed beneath the tread. The hoop in combination with the rest of the tire structure could support the vehicle weight in the uninflated condition.

Numerous methods have been used to achieve workable runflat tire designs. Generally, such tires incorporate sidewall designs that are thicker and/or stiffer, so that the tire's load can be carried by an uninflated tire with minimum adverse effects upon the tire itself and upon vehicle handling until such reasonable time as the tire can be repaired or replaced. The methods used in sidewall stiffening include the incorporation of circumferentially disposed inserts in the inner peripheral surface of the sidewall portion of the carcass, which is the region in the tire usually having the lowest resistance to deformation under vertical loading. In such runflat tire designs, the sidewalls are thickened in a way that each is approximately uniformly thick in the sidewall region between the bead and the tread. The reinforced sidewalls of such tires, when operated in the uninflated condition, experience a net compressive load. The outer portions of the reinforced sidewalls are in tension due to bending stresses which deflect the sidewalls outward or apart from one another in the regions of the sidewall adjacent to the ground-contacting portion of the tread. The inner portions of such reinforced sidewalls, in the region near where the tread contacts the ground, tend to be in compression during runflat operation. Due to the large amounts of rubber required to stiffen the sidewall members, heat buildup due to flexure of the sidewalls is a major factor in tire failure, especially when the uninflated tire is operated for prolonged periods at high speeds.

A Goodyear patent U.S. Pat. No. 5,368,082 ('082) disclosed a low aspect runflat pneumatic radial ply tire which employs special sidewall inserts to improve stiffness. Approximately six additional pounds of weight per tire was required to support an 800 lb load in this uninflated tire. This earlier invention, although superior to prior attempts at runflat tire design, still imposed a weight penalty that could be offset by the elimination of a spare tire and the tire jack. This weight penalty was even more problematic when the engineers attempted to build high-aspect-ratio tires for large luxury touring sedans. These taller sidewalled tires, having aspect ratios in the 55% to 65% range or greater, means that the sidewall bending stresses are greater than that of the earlier low-aspect-ratio runflat tires disclosed in the '082 patent. Thus the sidewalls of high profile tires had to be stiffened to the point of compromising ride characteristics, a result that is not generally acceptable for luxury vehicles, even to achieve runflat capability. The engineering requirements for runflat tire design are striving to achieve no loss in ride or handling. In the very stiff suspension performance type vehicle, such as sport cars and various sport/utility vehicles, the ability to provide such runflat tires is relatively straightforward compared to providing similar runflat tires for luxury sedans which require softer ride characteristics. Light trucks and sport utility vehicles, although not as sensitive to ride performance, provide a runflat tire market that ranges from accepting a stiffer ride to demanding the softer luxury type ride.

Considering runflat tire design in greater detail, it is typically based on the installation of one or more inserts inside each sidewall flex area. The inserts in each sidewall, in combination with the plies, add rigidity to the sidewalls in the absence of air pressure during runflat operation. While the high resistance to compressive deflection of the inserts provides the necessary resistance to the collapse of the uninflated loaded tire, this method has several drawbacks which include the above mentioned increase in tire weight and, especially during runflat operation, heat buildup in the insert reinforcements of the sidewalls.

Moreover, during runflat operation, the thick, reinforced sidewalls tend to transmit bending stresses to the portion of the tread that contacts the ground. The result is that the central portion of the tread tends to buckle upward from the ground. The upward buckle reduces the ground contact in the tread's central region, resulting in compromised vehicle handling as well as reduced runflat tread life.

A number of prior art patent references disclose solutions to problems relating to runflat tire operation. The European Patent Application EP-A-0 605 177 (BRIDGESTONE CORP) discloses a pneumatic radial tire including at least one tie-element layer for resisting force generated in width directions of the tire. French Patent Application FR-A-2 460 218 (KLEBER COLOMBES) discloses a pneumatic radial including supports for runflat operation. French Patent Application FR-A-2 425 334 (KLEBER COLOMBES) discloses a pneumatic radial tire having runflat inserts in the sidewalls. European Patent Application EP-A-0 778 164 (BRIDGESTONE) discloses a pneumatic radial tire having runflat capability and an auxiliary layer between the carcass and the belt layer. French Patent Application FR-A-2 287

350 (GOODRICH) discloses a pneumatic radial tire having runflat capability and reinforcement members 12.

Besides the problems from tread buckling, the cyclical flexure of the tread during runflat operation tends to cause excessive heating of the tread and sidewall materials, especially during high-speed, runflat operation. The excessive heating leads to deterioration of the tire structure in the region of the tread and sidewall and thereby reduces the runflat tire's operating life in the runflat mode. A hypothetically perfect runflat tire would be able to maintain the central portion of its tread in the same degree of road contact during runflat operation as during fully inflated operation.

OBJECTS OF THE INVENTION

It is an object of the present invention to provide a runflat radial tire as defined in one or more of the appended claims and, as such, having the capability of being constructed to accomplish one or more of the following subsidiary objects.

One object of the present invention is to provide a runflat radial tire having a laterally and circumferentially stiffened tread that resists upward buckling during runflat operation.

Another object of the present invention is to provide a runflat radial tire having a laterally and circumferentially stiffened tread that resists upward buckling during runflat operation by adding one or more compression-bearing reinforcements to the steel belt structure.

Another object of the present invention is to provide a runflat radial tire having a laterally and circumferentially stiffened tread that resists upward buckling during runflat operation by adding one or more tensile-bearing reinforcements across, and radially inward of, the crown region of the ply structure.

Another object of the present invention is to provide a runflat radial tire having a laterally and circumferentially stiffened tread that resists upward buckling during runflat operation by adding one or more compression-bearing reinforcements to the steel belt structure and one or more tensile-bearing reinforcements across, and radially inward of, the crown region of the ply structure.

Still another object of the present invention is to provide a runflat radial tire having a laterally and circumferentially stiffened tread that gives superior high-speed runflat handling characteristics by improving the tread's runflat contact with the road by adding one or more compression-bearing reinforcements to the steel belt structure and/or one or more tensile-bearing reinforcements across the crown region of the tire in the region radially inward of the ply structure.

Yet another object of the present invention is to provide a runflat radial tire having a laterally and circumferentially stiffened tread that gives superior runflat service life as a result of reduced tread flexure which is obtained by means of adding one or more compression-bearing reinforcements to the steel belt structure and/or one or more tensile-bearing reinforcements across the crown region of the tire in the region radially inward of the ply structure.

SUMMARY OF THE INVENTION

The present invention relates to a pneumatic radial ply runflat tire having a tread, a casing with two insert-reinforced sidewalls, two inextensible annular beads, a radial ply structure, a belt structure located radially between the tread and the radial ply structure, one or more circumferentially deployed compression-stress-bearing belt reinforcing layers adjacent to or distributed within the belt structure, and/or one or more circumferentially deployed tensile-stress-bearing fabric reinforcing layers located in the region adjacent to or distributed within the radial ply structure. The cords of the one or more belt reinforcing layers are aligned between about 20 degrees to 90 degrees with respect to the equatorial plane of the tire, and are made of metal. The reinforcing cords of the one or more fabric reinforcing layers are oriented between about 20 degrees to 90 degrees with respect to the equatorial plane of the tire. The one or more metal belt reinforcing layers are deployed adjacent to the belt structure, within the belt structure or are separated from one another by the belt structure or by individual belts of the belt structure. The one or more fabric reinforcing layers are deployed adjacent to the crown portion of the radial ply structure, within the ply structure or are separated from one another by the ply structure or by individual plies of the ply structure. The one or more belt reinforcements and/or one or more fabric reinforcements contribute to the lateral rigidity of the tread and underlying structures of the carcass. At least one of the tire's radial plies might be reinforced with inextensible metal cords.

In one embodiment of the invention, the pneumatic runflat radial tire has low-aspect-ratio (in the range of about 30% to about 50%) design. Such an embodiment has potential for runflat use in high-performance sports type vehicles or light trucks. This low-aspect-ratio radial ply runflat pneumatic tire contains two circumferentially deployed metal belts deployed radially inward of the tread surface, tread radial plies, a belt reinforcing layer and a fabric reinforcing layer. The fabric reinforcement layer has reinforcing cords that are oriented more or less laterally across the crown region of tire. The belt reinforcement layer has metal reinforcing cords also oriented more or less laterally across the crown region of tire. The metal belt reinforcement layer contributes compressive strain resistance to the belt structure, while the fabric layer contributes tensile strain resistance to the ply structure during underinflated or uninflated conditions. During runflat operation, the improved lateral and circumferential rigidity of the tread contributes to better vehicle handling and stability during high-speed, runflat operation. The improved lateral and circumferential rigidity also decreases the runflat cyclical flexure of the tread that can cause heat build which can accelerate the deterioration of the tire.

A second embodiment of this invention relates to a high-aspect-ratio (in the range of about 50% to about 80%) version of the low-aspect-ratio version for a high-profile tire. An example of a use of high-profile embodiment would be in luxury-type vehicles, high-standing sport-utility vehicles, and some light trucks. During runflat operation, the improved lateral rigidity of the tread contributes better runflat tire life and better vehicle handling and stability during high-speed runflat operation.

A third embodiment of this invention relates to a radial ply runflat tire having at least one radial ply which is reinforced by essentially inextensible cords such as steel.

A fourth embodiment of this invention relates to a radial ply, runflat tire having two compressive-stress-reinforcing reinforcement layers deployed such that one of them is located radially outward of the radially outer-most belt while the other is located between the two belts. This tire can also include two tensile-stress-bearing fabric reinforcement layers deployed such that one fabric layer is located radially inward of the radially inner-most-ply while the other fabric layer is located between the two plies.

BRIEF DESCRIPTION OF THE DRAWINGS

The structure, operation, and advantages of the invention will become further apparent upon consideration of the following description taken in conjunction with the accompanying drawings, wherein:

FIG. 5b shows the orientation angle of the cords in the belt reinforcing layer of FIG. 5a;

DEFINITIONS

"Apex" means an elastomeric filler located radially above the bead core and between the plies and the turnup plies.

"Aspect Ratio" means the ratio of the section height of a tire to its section width.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from about 18° to 30° relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface.

"Inner Liner" means the layer or layers of elastomer or other material that form the inside surface of a tubeless tire and that contain the inflating fluid or gas within the tire.

"Insert" means the crescent-shaped or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Normal Inflation Pressure" means the specific design inflation pressure at a specified load assigned by the appropriate standards organization for the service condition of the tire.

"Normal Load" means the specific design load at a specified inflation pressure assigned by the appropriate standards organization for the service condition of the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between about 65° and 90° with respect to the equatorial plane of the tire.

"Radial Ply Tire" means a belted or circumferentially-restricted pneumatic tire in which at least one ply has cords that extend from bead to bead and are laid at cord angles between about 65° and about 90° with respect to the equatorial plane of the tire.

"Section Height" means the radial distance from the nominal rim diameter to the outer diameter of the tire at its equatorial plane.

"Section Width" means the maximum linear distance, parallel to the axis of the tire and between the exterior of its sidewalls, when and after it has been inflated at normal inflation pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Tread Contour" means the shape of a tire tread as viewed in axial cross section.

"Tread Width" means the arc length of the tread surface in the plane includes the axis of rotation of the tire.

"Wedge Insert" means the same as "Insert."

DETAILED DESCRIPTION OF THE PREFERRED EMBODIMENT

Prior Art Embodiment

Figure 1:
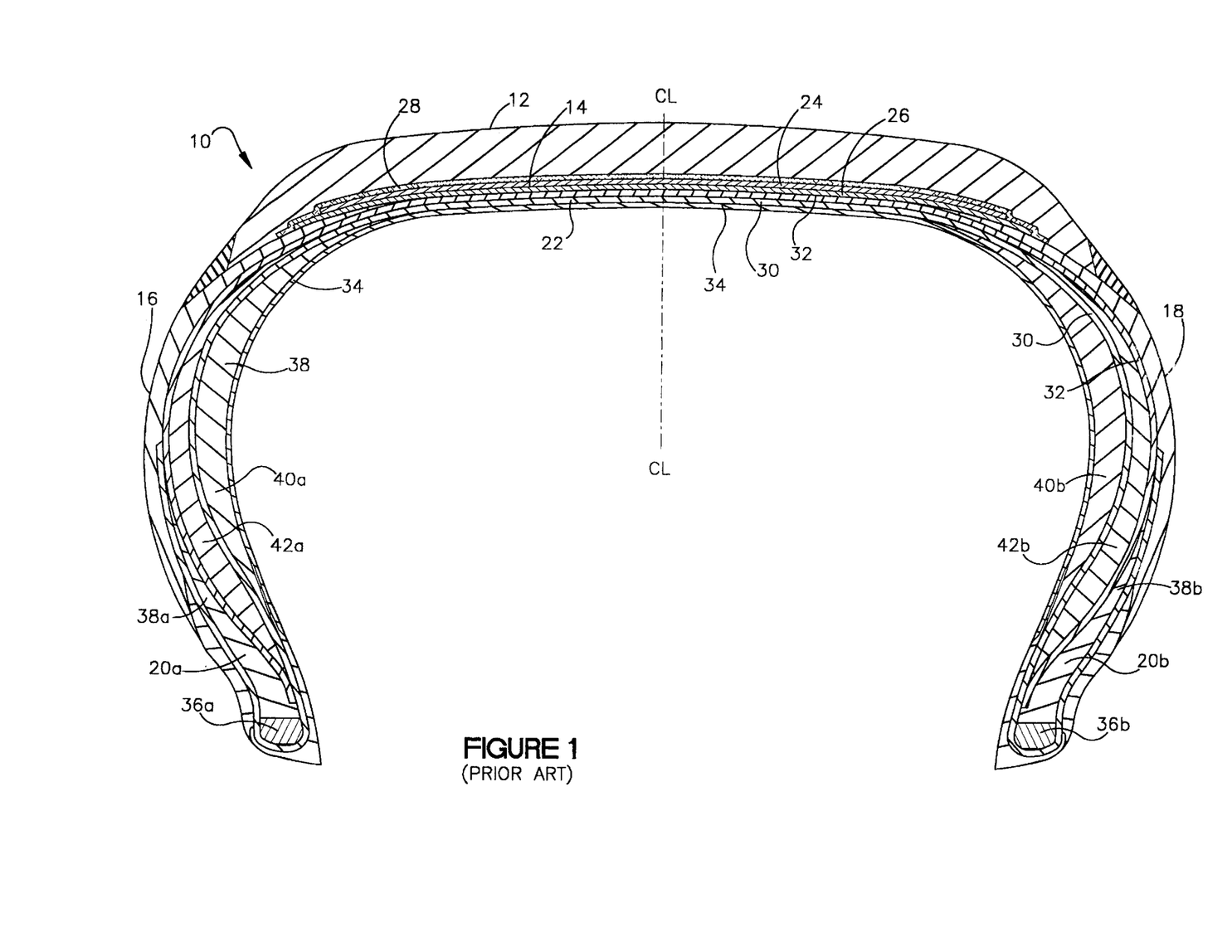
FIG. 1 is a cross-sectional view of a prior art runflat tire design incorporating insert-reinforced sidewalls.

With reference to FIG. 1, a cross section of a typical, prior art low-profile pneumatic radial runflat tire 10 is illustrated. The tire 10 has a tread 12, a belt structure 14, a pair of sidewall portions 16,18, a pair of bead regions 20a,20b and a carcass structure 22. Belt structure 14 consists of two belts 24,26 and a fabric overlay 28 deployed between the bottom portion of tread 12 and the upper parts of the belt structure. The fabric overlay 28 is applied by conventional means such as by helically winding a cord reinforced ribbon. The carcass 22 includes a first ply 30 and second ply 32, a gas-impervious inner liner 34, a pair of beads 36a,36b, a pair of bead filler apexes 38a,38b, a first pair of inserts 40a,40b, and a second pair of inserts 42a,42b. The first or innermost insert 40a,40b is located between.the inner liner 34 and the first ply 30, and the second insert 42a, 42b is located between the first ply 30 and second ply 32. Fabric overlay 28 is disposed beneath, or radially inward of, tread 12 and on top of, or radially outward from, belt structure 14. The reinforced sidewall portions 16,18 of carcass structure 22 give the tire 10 a limited runflat capability.

As can be seen from FIG. 1, the structural reinforcement in the sidewall area of the tire 10 substantially increases the overall thickness of the sidewall portions 16,18. This generalized prior art runflat tire design shows the more or less uniformly thickened sidewalls that characterize runflat tire designs. Such insert-reinforced sidewalls are necessary to support the tire's load with minimal sidewall deformation when the tire 10 is in an underinflated or uninflated state. Such runflat tire designs provide reasonable vehicle handling and performance under conditions of full inflation, and they yield reasonable runflat tire life and vehicle handling when the tire is underinflated or uninflated. Runflat tires generally weigh more than equivalent non-runflat-capable tires, because of the additional weight of the reinforcement material in the sidewalls; this additional weight is greater in high-profile runflat tires than in low-profile runflat tires.

Figure 2A:
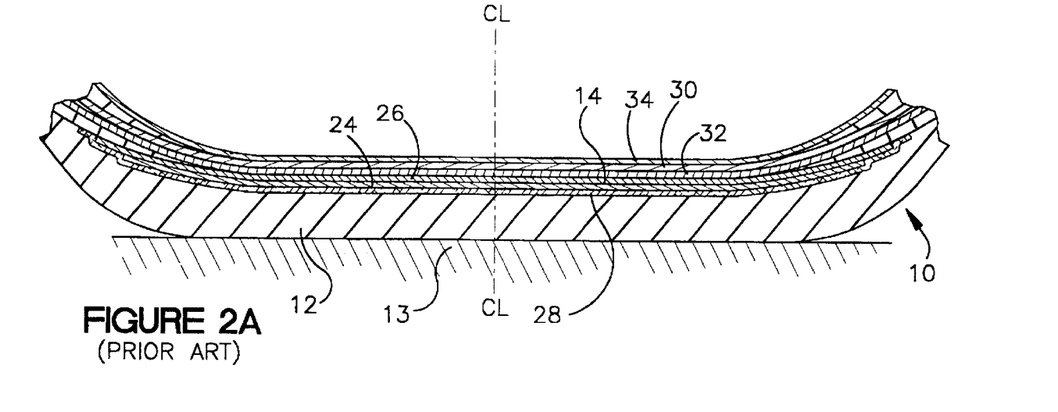
FIG. 2a is a fragmentary cross-sectional schematic view of the ground-contacting portion of the prior art runflat tire of FIG. 1 in normally inflated condition.

FIG. 2a shows a fragmentary schematic of a normally inflated prior art tire, such as illustrated in FIG. 1, with its tread 12 in contact with the ground 13. The flattening of the tread 12, in the region where it contacts the ground 13, induces bending stresses in the tread and its underlying components, including belt structure 14, overlay fabric 28, belts 24,26, radial plies 30,32, and inner liner 34. More specifically, the bending stresses derive from the flattening of the tread 12 from the as-molded and/or the as-inflated lateral curvature of tread and its underlying structures. These bending stresses induce tensile stresses in the radially inward structures beneath tread 12, such as the inner liner 34 and the radial plies 30,32. Corresponding compressive stresses are induced in the elastomeric material of tread 12 and such underlying structures as the fabric overlay 28 and portions of the belt structure 14.

Figure 2B:
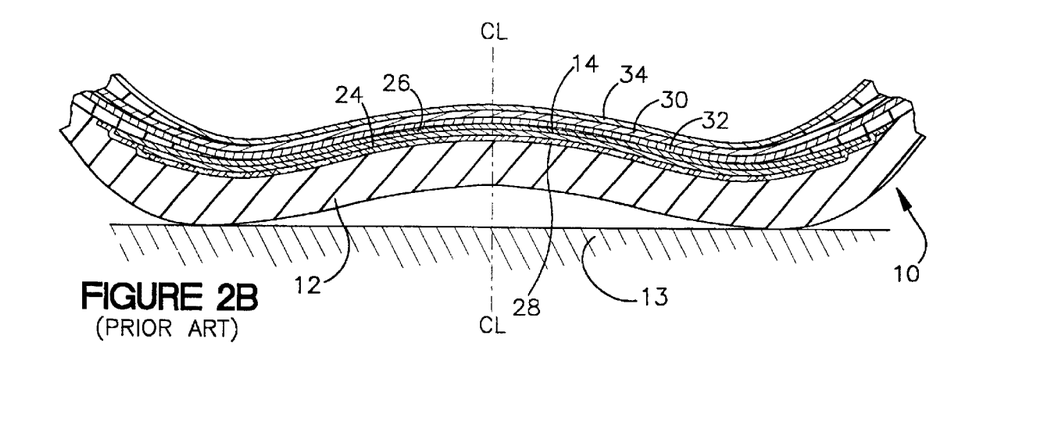
FIG. 2b is a fragmentary cross-sectional schematic view of the ground-contacting portion of the prior art runflat tire of FIG. 1 in an uninflated condition.

FIG. 2b illustrates the upward buckling of tread 12 of the uninflated prior art runflat tire 10 in the region where the load-bearing tread contacts the flat road surface 13. The upward buckling of the central tread region corresponds to the formation of bending stresses in the central portions of tread 12 and its underlying structures. The bending stresses in the tread 12 during runflat operation, as illustrated in FIG. 2b, are greater than those associated with simple flattening of the tread during normal-inflated operation, as illustrated in FIG. 2a.

Figure 3:
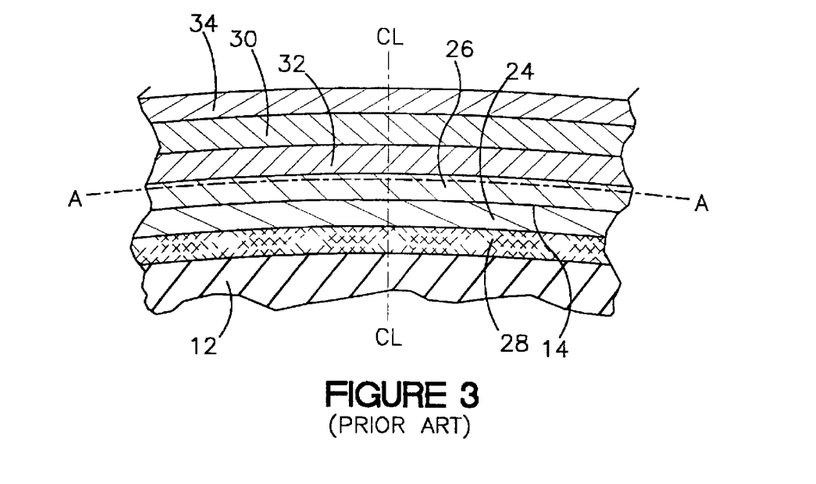
FIG. 3 is an enlarged fragmentary schematic view of the upward-buckled central portion of the uninflated prior art tire shown in FIG. 2b.

FIG. 3 is a fragmentary schematic detail (not in exact proportion) of the belts 24,26, plies 30,32, inner liner 34 and fabric overlay 28 as they would appear within the upward-buckled central portion (shown in FIG. 2b) of the tread 12 of the prior art tire. The neutral bending axis A—A shown in FIG. 3 is shown located in a plausible relationship with respect to the fabric overlay 28, belts 24,26, plies 30,32 and inner liner 34. Those skilled in the art will appreciate that, in FIG. 3, the structural elements of tread 12 which lie above the neutral axis A—A—i.e., radially inward of the tread 12—will experience tensile loading, while those structures located below the neutral axis A—A, i.e., closer to inner liner 34, will experience compressive loading in an under-inflated or uninflated tire. The location of neutral axis A—A in relation to belts 24,26 is approximate, taking into account the tensile-stress-bearing capabilities of radial plies 30,32 and the compressive-stress-bearing capabilities of the belts 24,26. The neutral axis A—A is shown to be located within belt 24 purely as an approximation of where it would lie given the relative greater modulus of elasticity of the steel cords in belts 24,26 compared to the modulus of the cords that reinforce the plies 30,32.

Preferred Embodiment

Figure 4:
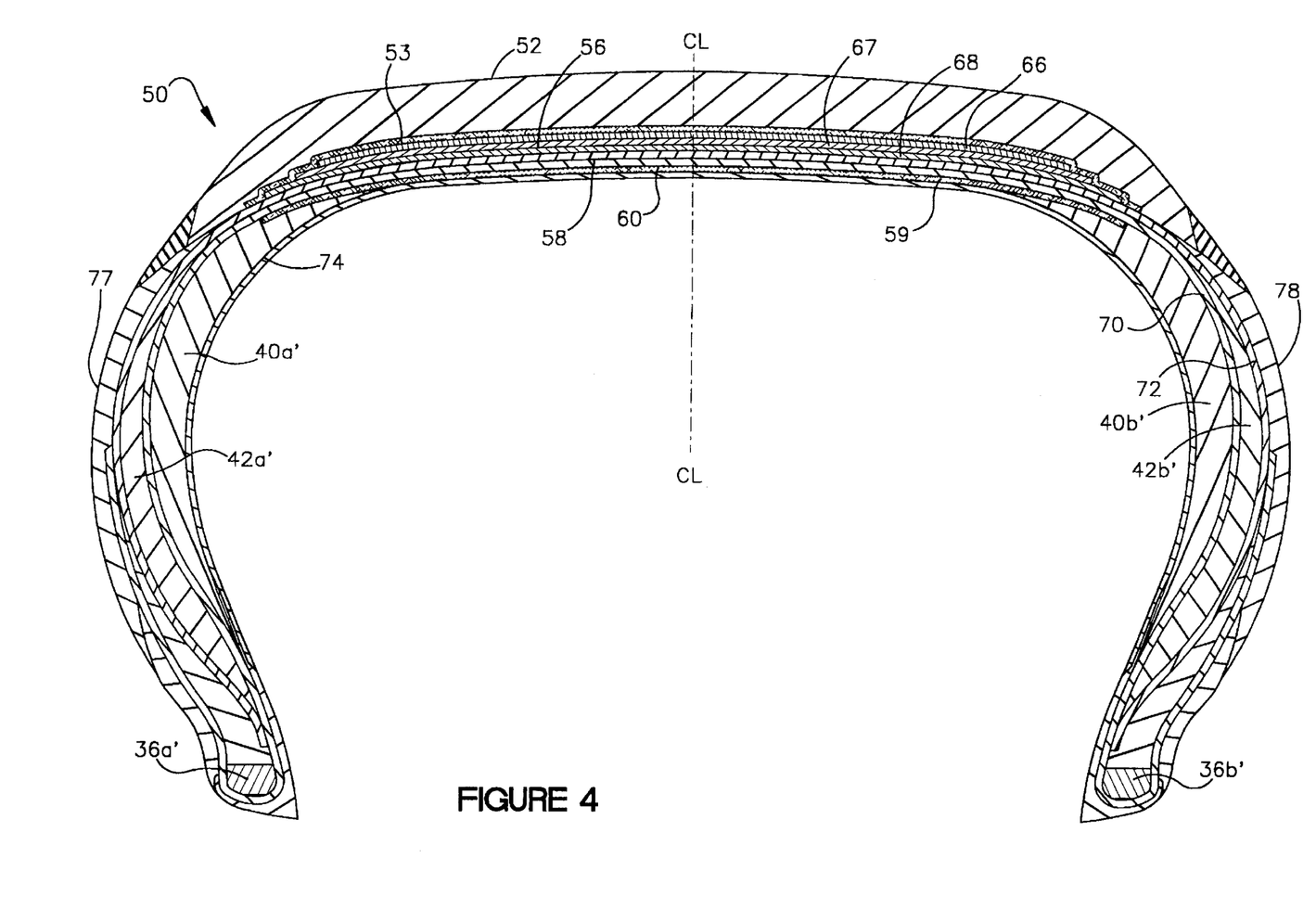
FIG. 4 shows one arrangement of the present invention, including tensile load bearing and compressive load bearing reinforcement layers.

FIG. 4 shows a pneumatic, radial ply, runflat tire 50 according to the present invention. Tire 50 has the same general sidewall construction as that of the prior art runflat tire 10 shown in FIG. 1. One of the inventive features of tire 50 in FIG. 4 is the addition of a tensile-stress-bearing, cord-reinforced fabric layer 59, deployed between the inner liner 74 and the radially innermost radial ply 70. Another inventive feature of tire 50 is a compression-stress-bearing incompressible layer 66 which, in the specific illustration of FIG. 4, is shown deployed above, or radially outward of, the belt structure 56 and beneath, or radially inward of, fabric overlay 53. In FIG. 4 and elsewhere in the specification, primed and double primed numbers represent structural elements which are substantially identical to structural elements represented by the same unprimed number.

Figure 5A:
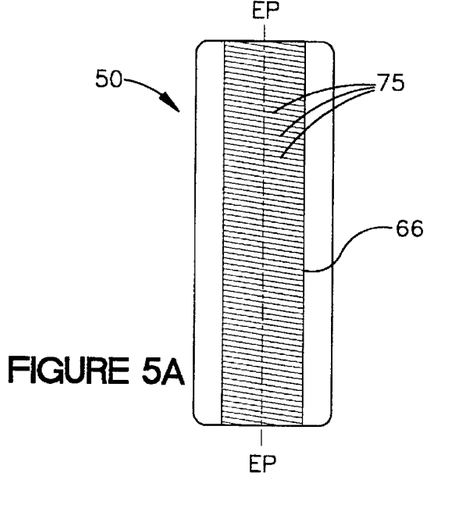
FIG. 5a shows the compression-stress-bearing belt reinforcing layer of the present invention.
Figure 5B:
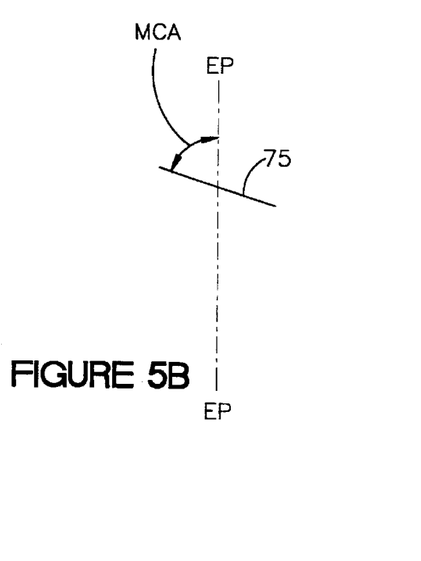

In FIG. 4, the width of the compression-stress-bearing reinforcement 66 is generally the same or less than that of the belt structure 56. FIG. 5a is a fragmentary schematic cross-sectional view of tire 50 showing the circumferentially deployed belt reinforcement 66, as it would appear if the tread and other overlying structures were removed. Belt reinforcement 66 is constructed of a plurality of wire or metal cords 75., as discussed in more detail below. FIG. 5b shows the metal cord angle MCA of incompressible metal cords 75 with respect to the equatorial plane EP of tire 50.

Figure 5C:
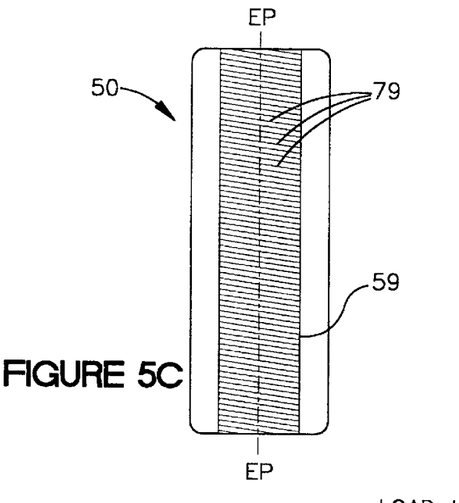
FIG. 5c shows the tensile-stress-bearing fabric reinforcing layer in accordance with the present invention.
Figure 5D:
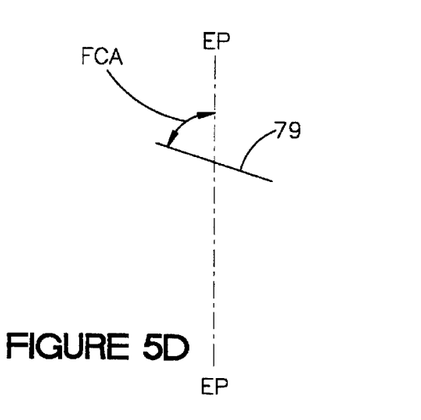
FIG. 5d shows the orientation angle of the cords in the fabric reinforcing layer of the present invention.

As illustrated in FIG. 4, the width of the tensile-stress-bearing fabric reinforcement 59 is generally the same as the of the overlying belt structure 56. FIG. 5c is a fragmentary schematic cross-sectional view of tire 50 showing the circumferentially deployed fabric reinforcement 59, as it would appear if the tread and plies and other overlying structures were removed. Fabric reinforcement 59 is constructed of high-modulus cords 79 as discussed in more detail below. FIG. 5d shows the fabric cord angle FCA of the high-modulus cords 79 with respect to the equatorial plane EP of tire 50. The practice of the inventive concept will become evident in the description below.

Operational Dynamics of the Preferred Embodiment

Referring to FIG. 4, one of the two inventive features incorporated in tire 50 is the compression-stress-bearing reinforcement 66, circumferentially deployed, in the instance of FIG. 4, on top of, or radially outward from, belt structure 56. In specific reference to the location of the belt reinforcement 66, it is believed that the belt reinforcement can serve generally the same operational function if it is placed between the belts 67,68 of the belt structure 56, or radially inward of the belt structure and radially outward of the ply structure 58 comprising plies 70,72.

A second of the inventive features, as shown in FIG. 4, is the tensile-stress-bearing fabric layer 59 which is circumferentially deployed, in the embodiment illustrated in FIG. 4, immediately radially inward of the ply structure 58 and immediately radially outward of the inner liner 74. In specific reference to the location of the tensile-stress-bearing fabric reinforcement 59, it is also within the terms of the invention for the fabric reinforcement to serve generally the same operational function when placed between the plies 70,72 of ply structure 58, or immediately radially outward of the ply structure and radially inward of the belt structure 56 comprising belts 67,68.

The operational dynamics of the inventive features of the present invention become clearer upon consideration of FIG. 2b and FIG. 3. FIG. 2b shows a cross-sectional view of the upward buckled tread 12 of the prior art tire 10 when it is operated in an uninflated condition. FIG. 3 shows a close-up view of the central-most portion of the upward-buckled tread 12. The neutral bending axis A—A in FIG. 3 is shown located close to the interface between the high-modulus belt structure 14 comprising belts 24,26 and the ply structure 58. Those knowledgeable of the art will recognize that bending of tread 12, and of such underlying structures as the belt structure 14 and the radial plies 30,32, results in the formation of tensile stresses in those parts of the tire's structure that lie upwards (towards the inner liner 34) of the neutral bending axis A—A shown in FIG. 3, while compressive stresses will be induced in those portions of the tire that are situated below (towards the overlay 28) the neutral bending axis A—A.

The present invention gives increased lateral and circumferential rigidity to the tread 12, thereby increasing the tread's resistance to buckling, and the structures underlying the tread during runflat Operation. The method and structures of the present invention, as illustrated in FIG. 4, include incorporating either one or more high-modulus, tensile-load-bearing reinforcements 59 within or adjacent to the ply structure 58 and/or one or more high-modulus compressive-stress-bearing reinforcements 66 within or adjacent to belt structure 56 underlying the tread 52.

In one embodiment, the respective tensile-load-bearing and compressive-load-bearing reinforcing layers, are deployed in the region adjacent to the neutral bending axis A—A, as shown in FIG. 3. More specifically, as shown in FIG. 4, one or more high-modulus, tensile-stress-bearing reinforcements or layers 59 are deployed in the region adjacent to the neutral bending axis A—A (on the side of the inner liner 34 in FIG. 3) where tensile stresses are produced during buckling of the tread 12. In addition, one or more high-modulus, compressive-stress-bearing reinforcements or layers 66 are deployed in the region adjacent to the neutral axis A—A (on the side of the overlay 28 in FIG. 3) where compressive stresses are produced during upward buckling of the tread.

A second mechanism by which to stiffen the tread 12 involves the separation between the tension-bearing reinforcements 59 and the compression-bearing reinforcements 66. This separation is, in the present invention, brought about by the simple addition of reinforcement layers to the respective compression-stress and tensile-stress regions adjacent to the neutral bending axis A—A, as shown in FIG. 3.

Figure 6:
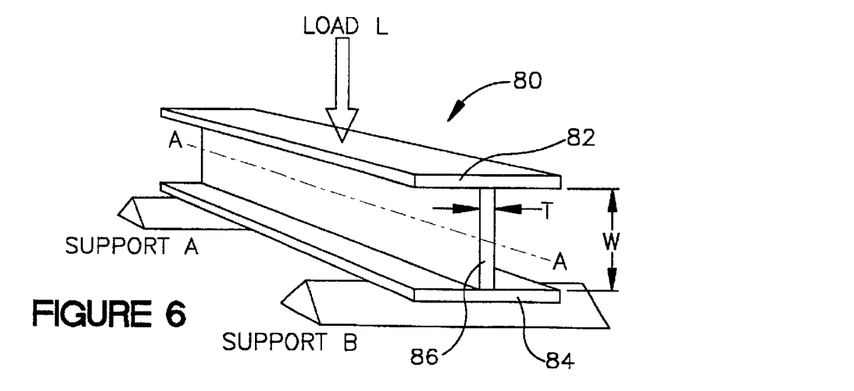
FIG. 6 is a schematic view of a structural I-beam which demonstrates the mechanical actions of the inventive concept of the present invention in contributing to the stiffening of the tread and underlying structures of the improved tire design disclosed herein.

The basic principle of separation of the tensile and compressive elements becomes evident in the contemplation of a structural I-beam 80, as illustrated in FIG. 6, where the web portion 86 of the I-beam separates the respective compression-bearing and tension-bearing flanges 82,84, respectively. More specifically, FIG. 6 shows an I-beam 80, supported at its ends by support elements A and B. I-beam 80 is shown supporting a central load L, which is such that the upper flange 82 of the I-beam is in compression, while the lower flange 84 is in tension. The flanges 82,84 are separated from one another by web 86. Assuming that the dimensions and physical properties of flanges 82,84 are uniform and isotropic, and that the thickness of the web 86 is uniform between the flanges, then the neutral bending axis A—A will occur along the center of the I-beam 80, as shown in FIG. 6. As the width W of web 86 increases, the moment of inertia of I-beam 80 correspondingly increases with respect to bending under the force of load L. In other words, the rigidity of the I-beam 80, with respect to deformation under the weight of load L, increases in direct relation to the width W of web 86, as it separates flanges 82,84. Similarly, in FIGS. 2a, 2b and 3, the tread 12 of the prior art tire 10 could be made stiffer and more resistant to buckling if the tension-bearing plies 30,32 and the compression-bearing belts 24,26 were both to be increased in strength (corresponding to thicker flanges 82,84 in FIG. 6) and separated farther from one another (corresponding to a wider web 86 in FIG. 6).

The present invention, as shown in FIG. 4, achieves tread stiffening, or resistance to buckling under runflat conditions, by the addition of one or the other or both of the belt reinforcements 66, which resists compressive strain deformation, and the fabric reinforcement 59, which resists tensile strain deformation. In reference to the I-beam analogy in FIG. 6, the respective belt and fabric reinforcements 66,59 correspond to the I-beam flanges 82,84. Also, the additional thickness of the tread 52 and its underlying carcass structure 60 and belt structure 56, plus the compressive reinforcement layer 66 and tensile reinforcement layer 59, give a greater thickness to the carcass structure and belt structure, which additional thickness corresponds, in the I-beam analogy, to the rigidity-inducing benefits of increasing the width W of the web 86 of I-beam 80 shown in FIG. 6.

Figure 7:
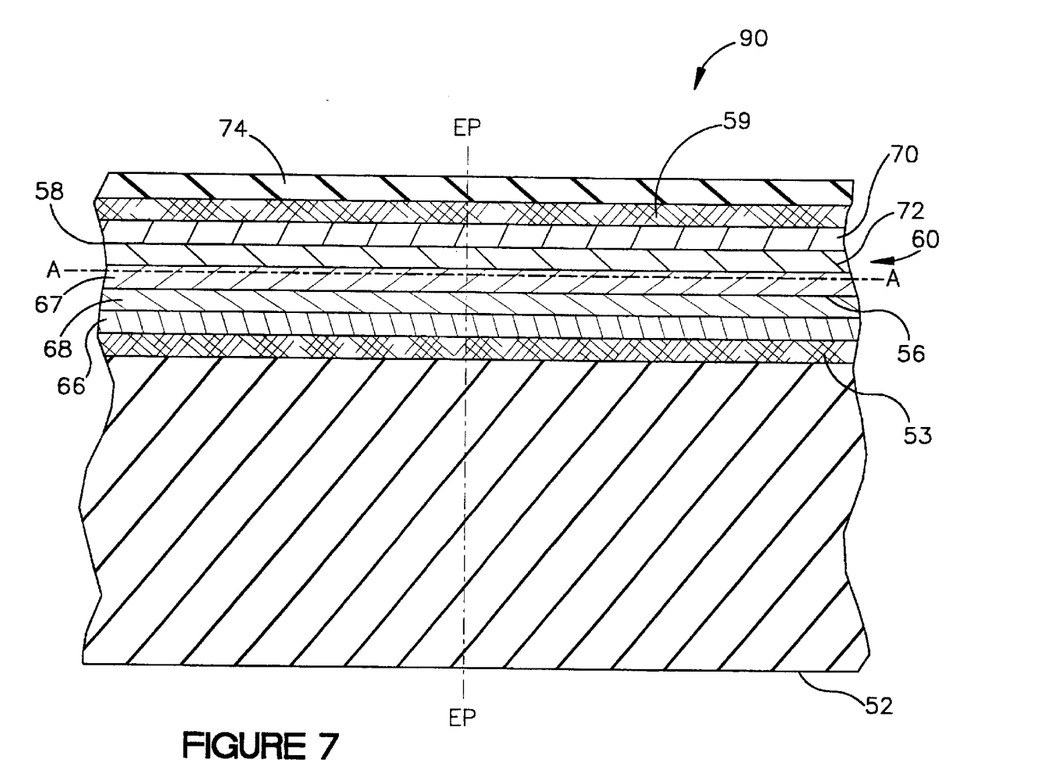
FIG. 7 is a fragmentary cross section of the central portion of the tread and underlying carcass structure of the tire illustrated in FIG. 4.

FIG. 7 shows a fragmentary cross-sectional view of a segment of tread 52 and underlying carcass 90 in the region of the equatorial plane EP. Carcass segment 90 comprises inner liner 74, tensile-stress-bearing fabric layer 59, ply structure 58 (with plies 70,72), belt-structure 56 (with belts 67,68), compressive-stress-bearing layer 66, and fabric overlay 53.

The benefits of the incorporation of one or more belt reinforcement layers 66 and/or one or more fabric layer reinforcement layers 59 can be more specifically appreciated by discussing each reinforcement separately in relationship to neutral bending axis A—A, as shown in FIG. 7.

Compression-Stress-Bearing Belt Reinforcement Layer

In FIGS. 4 and 7, the compression-stress-bearing reinforcing layer 66 is shown located radially outward of belt structure 56 which comprises belts 67,68. The circumferentially deployed reinforcing layer 66 is constructed from incompressible, high-modulus material such as wire or metal cords 75, as shown in FIG. 5a. FIG. 5b shows the metal cord angle MCA of the metal wires or cords 75 with respect to the equatorial plane EP of tire 50. The cord angle MCA is about 20 degrees to 90 degrees, preferably about 45 degrees to about 85 degrees, and most preferably about 80 degrees with respect to the EP. The cord angles as defined herein include both the right and left or plus and minus directions.

FIG. 7 shows a plausible location for the neutral bending axis A—A of a flat carcass segment 60 in the region of the tire's equatorial plane EP.

In FIG. 7, the portions of carcass 90 located below, or radially outward of, the neutral bending axis A—A will experience compressive stresses during runflat operation, while the portions of the carcass located above, or radially inward of, the neutral bending axis will experience tensile stresses during runflat operation.

The location of the belt reinforcement layer 66, shown in FIGS. 4 and 7, is in the most extreme position with respect to the neutral bending axis A—A, which thereby gives the maximum mechanical advantage to the belt reinforcement layer with respect to resisting compressive stresses associated with runflat operation—in other words, belt reinforcement layer 66, in the location shown in FIGS. 4 and 7, has a mechanical advantage in resisting upward buckling of the central portion of the tread 52 during runflat operation.

The inventors recognize that more than one compression-stress-bearing layer 66 would correspondingly increase the lateral and circumferential rigidity of tread 52 with respect to upward buckling during runflat operation of tire 50. The inventors also recognize the potential for tailoring the lateral rigidity of tread 52 by means of deploying the one or more compressive-stress-bearing layers 66 between the belts 67,68 of the belt structure 56, or radially inward of the belt structure to further minimize the effect on inflated tire performance, or by distributing two or more reinforcement layers among the belts 67,68.

Tensile-Stress-Bearing Fabric Reinforcement Layer

In FIGS. 4 and 7, tensile-stress-bearing reinforcing fabric layer 59 is shown located radially inward of the ply structure 58, which comprises radial plies 70,72. The circumferentially deployed fabric reinforcing layer 59 is constructed from fabric that is reinforced with high-modulus cords made from materials of the type that come from the family of materials that include aramid, rayon, and polyester. FIG. 5c shows the circumferential fabric layer 59 and its reinforcing cords 79. FIG. 5d shows the fabric cord angle FCA of the reinforcing cords 79 with respect to the equatorial plane EP of tire 50. The cord angle FCA is about 20 degrees to 90 degrees, preferably about 45 degrees to about 85 degrees, and most preferably about 80 degrees, each with respect to the EP.

In FIG. 7, the portions of carcass segment 90 located above, or radially inward of, the neutral bending axis A—A will experience tensile stresses during runflat operation. The location of the fabric reinforcement layer 59, shown in FIGS. 4 and 7, is in an extreme location with respect to the neutral bending axis A—A, which thereby gives the maximum mechanical advantage to the fabric reinforcement layer with respect resisting tensile stresses associated with runflat operation. That is, fabric (textile) reinforcement layer 59, in the location shown in FIGS. 4 and 7, has mechanical advantage in resisting upward buckling of the central portion of the tread 52 during runflat operation.

The inventors recognize that more than one tensile-stress-bearing layer 59 would correspondingly increase the lateral and circumferential rigidity-of tread 52 with respect to upward buckling during runflat operation of tire 50. The inventors also recognize the potential for tailoring the lateral rigidity of tread 52 by means of deploying the one or more tensile-stress-bearing fabric layers 59 between the plies 70,72 of the ply structure 58, or radially outward of the ply structure, or by distributing two or more reinforcement layers among the plies 70,72.

Figure 8:
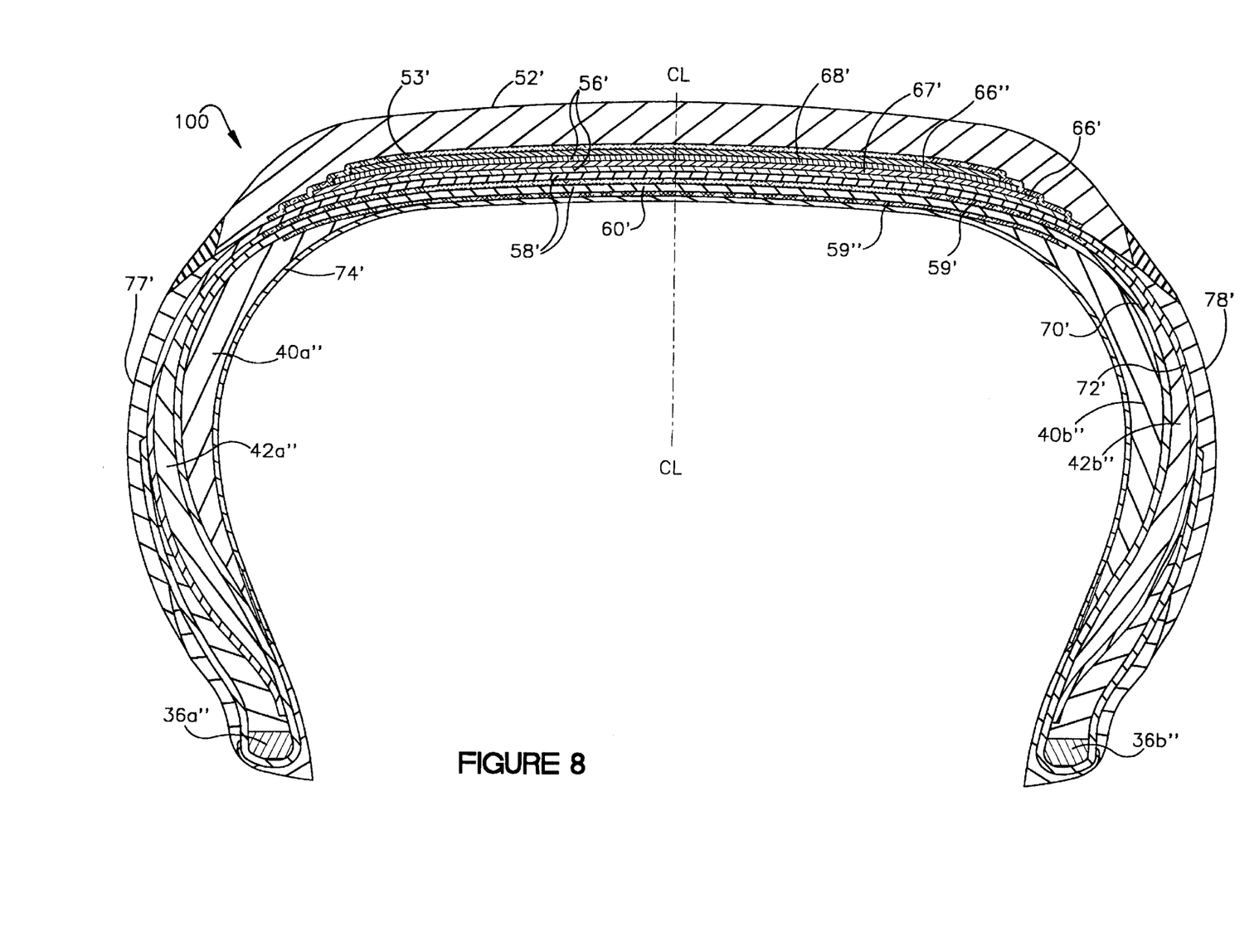
FIG. 8 is a cross-sectional view of a pneumatic, radial runflat tire where in a fabric overlay is used in conjunction with another embodiment of the present invention.

FIG. 8 is a cross-sectional view of one embodiment of the present invention as used in a pneumatic radial ply runflat tire 100 in which two compressive-stress-reinforcing layers 66',66" are deployed such that one reinforcing layer 66" of them is located radially outward of the radially outer-most belt 68' while the other 66' is located between the belts 67' and 68'. Additionally, two tensile-stress-bearing fabric reinforcement layers 59',59" are deployed such that one fabric layer 59' is located radially inward of the radially inner-most ply 72' while the other fabric layer 59" is located between the two plies 70' and 72'. Typically the reinforcing cords of the adjacent reinforcement layers are in crossed relation to each other. The angles of the cords are disposed at the same angles as the cords of a single reinforcement layer as previously defined.

Operation of the Inventive Concept in Relation to Prior Art

The inventive concept addresses the tread buckling (which is also known as "tread lift") associated with runflat tires when they are operated in the runflat mode.

To reiterate the origins of the tread buckling associated with runflat operation of runflat-type tires, the reinforced sidewalls 16,18 of a prior art uninflated runflat tire 10 of the type shown in FIG. 1 tend to buckle axially outwards in such a way as to transmit upward directed bending stresses to the tread 12 and underlying structures such that the central portion of the tread has reduced to zero contact with the road. Upward buckling of the tread can have adverse effects upon vehicle handling in the runflat mode, especially during high-speed operation. In addition, the cyclical flexing of the tread during runflat operation tends to cause heating of the tread material, especially during high-speed operation, which can cause accelerated deterioration of the tire structure in the region of the tread, thereby reducing the runflat tire's operating life in the runflat mode. A hypothetically perfect runflat tire would be able to maintain the central portion of its tread in the same degree of road contact during runflat operation as during fully inflated operation.

In this invention, the incorporation of the one or more compressive-stress-bearing metal reinforcements 66',66" in the region of the belt structure 56' (FIG. 8) and/or the incorporation of the one or more tensile-stress-bearing fabric reinforcements 59',59" in the region adjacent to or within the ply structure 58' work to increase the lateral and circumferential rigidity of the tread 52'.

Thus it follows, as shown in FIG. 8, that the compression-load-bearing capacity of the reinforced belt structure 56' and/or the tensile-load-bearing capacity of the fabric reinforced ply structure 58' result in a runflat tire 100 having a tread 52' whose lateral rigidity resists the upward buckling of the central portion of the tread during runflat operation. This invention, by increasing the lateral and circumferential rigidity of the tread, gives enhanced runflat vehicle handling and increased runflat tire life. Further, the addition of the reinforcements to the belt and/or ply structure improves the inflated footprint pressure distribution giving better wear and handling during normal inflation pressure operation.

EMBODIMENT ONE

Referring to FIG. 4, there is illustrated a first embodiment of the invention within a runflat radial ply tire 50. Such an embodiment would have potential for runflat use in high-performance sports type vehicles or light trucks, if provided as a low-aspect-ratio runflat radial ply runflat pneumatic tire, or if provided as a high-aspect-ratio tire for luxury-type vehicles, high-standing sport-utility vehicles, and some light trucks. Tire 50 contains two belts 67,68, two plies 70,72, a belt reinforcing layer 66 and a fabric reinforcing layer 59. Fabric reinforcement layer 59 has reinforcing cords 79 that are oriented more or less laterally across the crown region of tire 50. Belt reinforcement layer 66 has metal reinforcing cords 75 also oriented more or less laterally across the crown region of tire 50. The metal belt reinforcement layer 66 contributes compressive strain resistance to the belt structure 56. The fabric reinforcement layer 59 contributes tensile strain resistance to the ply structure 58. During runflat operation, the improved lateral rigidity of the tread gives better vehicle handling and stability during high-speed runflat operation as well as increased runflat tire life.

EMBODIMENT TWO

A second embodiment is envisioned in which this invention is incorporated within a radial ply runflat tire, as also shown in FIG. 4, having at least one radial ply 70 or 72 which is reinforced by essentially inextensible fibers or cords made of metal such as steel, such as is disclosed in U.S. patent application 08/865,489, and in which the aspect ratio of the tire can be low or high or intermediate between the maximum and minimum values of aspect ratios for runflat tires.

EMBODIMENT THREE

A third embodiment is shown in FIG. 8, where two compressive-stress-reinforcing layers 66',66" are deployed such that one is located radially outward of the radially outer-most belt 68' while the other is located between the belts 67' and 68'. This embodiment also contains two tensile-stress-bearing fabric reinforcement layers 59',59" which are deployed such that one fabric layer 59" is located radially inward of the radially inner-most ply 70' while the other fabric layer 59' is located between the two plies 70',72'. Typically the reinforcing cords of the adjacent reinforcement layers are in crossed relation to each other. The angles of the cords are disposed at the same angles as the cords of a single reinforcement layer, as previously defined.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

What is claimed:

1. A pneumatic radial ply runflat tire having a tread, a carcass with two sidewalls and two inextensible annular beads, a radial ply structure, one or more sidewall reinforcing inserts, and a belt structure located between the tread and the radial ply structure, at least one circumferentially deployed compression-stress-bearing belt reinforcing layer located in the region of the belt structure, and at least one circumferentially deployed tensile-stress-bearing fabric reinforcing layer located in the region of the radial ply structure, said runflat tire characterized by:

the at least one circumferentially deployed compression-stress-bearing belt reinforcing layer having reinforcing metal cords being aligned between 20 degrees and 85 degrees with respect to the equatorial plane of the tire;

the at least one circumferentially deployed tensile-stress-bearing fabric reinforcing layer having cords being aligned between 45 degrees and 85 degrees with respect to the equatorial plane of the tire; and the at least one fabric reinforcing layer having reinforcing cords of high modulus material selected from the group comprising aramid, rayon and polyester.

2. The tire of claim 1 in which the width of the at least one circumferentially deployed belt reinforcing layer and at least one circumferentially deployed fabric reinforcing layer are approximately equal to the width of the belt structure.

3. The tire of claim 1 further characterized by the belt structure including at least two belts reinforced by cords.

4. The tire of claim 1 in which the radial ply structure includes at least two radial plies and at least one is reinforced with inextensible cords.

5. A pneumatic radial ply runflat tire having a tread, a carcass with two sidewalls and two inextensible annular beads, a radial ply structure, one or more sidewall reinforcing inserts, and a belt structure located between the tread and the radial ply structure of a radially outwardmost radial ply layer and a radially inwardmost radial ply layer, said runflat tire characterized by:

at least first and second tensile-stress-bearing fabric reinforcing layers being deployed such that the first of the tensile-stress-bearing fabric reinforcing layers is disposed radially inward of the radially outwardmost radial ply layer and the second of the ply reinforcing layers is disposed radially inward of the radially inwardmost radial ply layer.

6. A pneumatic radial ply runflat tire having a tread, a carcass with two sidewalls, two inextensible annular beads, a radial ply structure, one or more sidewall reinforcing inserts, and a belt structure located between the tread and the radial ply structure of a radially outwardmost radial ply layer and a radially inwardmost radial ply layer, said runflat tire characterized by:

at least first and second tensile-stress-bearing fabric reinforcing layers deployed such that the first and second reinforcing layers are separated by at least one of the radial ply layers of the radial ply structure.

* * * * *